United States Patent [19]

Nii

[11] Patent Number: 5,480,671
[45] Date of Patent: Jan. 2, 1996

[54] EMULSIFIED COMPOSITION OF OIL AND FAT, AND BREAD MADE BY USING SAME

[76] Inventor: Satoshi Nii, 18-7, Seijo 9-chome, Setagaya-ku, Tokyo, Japan

[21] Appl. No.: 202,199

[22] Filed: Feb. 25, 1994

[30] Foreign Application Priority Data

Mar. 31, 1993 [JP] Japan ................................. 5-109712

[51] Int. Cl.$^6$ .................................................. A23L 1/20
[52] U.S. Cl. ............................ 426/613; 426/653; 426/46; 426/549
[58] Field of Search .................................. 426/549, 601, 426/613, 653, 589, 46

[56] References Cited

U.S. PATENT DOCUMENTS 4,826,702  5/1989  Hayashi et al. ........................ 426/608

*Primary Examiner*—Jeanette Hunter
*Attorney, Agent, or Firm*—Goodman & Teitelbaum

[57] ABSTRACT

A natural-type emulsified composition of oil and fat which does not employ any synthetic compound. The emulsified composition of oil and fat is made by mixing a natural edible oil and fat, 3% to 97% by weight, with a fermented uncooked soybean paste, 3% to 97% by weight. The soybean paste is obtained by breaking the soybean to provide roughly broken soybean, feeding the roughly broken soybean into a sealed vessel, treating the soybean with steam under up to 1 kg/cm$^2$, rapidly discharging the soybean from the sealed vessel into the outside atmospheric pressure so that the soybean is puffed, powderizing it, and then fermenting the powder after adding malt and salt. Also provided is a food, such as bread, made by using the emulsified composition of oil and fat instead of a yeast food and/or shortening which include a synthetic emulsifier.

3 Claims, No Drawings

EMULSIFIED COMPOSITION OF OIL AND FAT, AND BREAD MADE BY USING SAME

BACKGROUND OF THE INVENTION

The present invention relates to a natural-type emulsified composition of an oil and fat, which enables the oil and fat to be easily added in the form of a natural product into a wide range of oil and fat requiring foods such as candies, bread, chocolate, meat products, and fish products. The invention also relates to bread made by using the emulsified composition instead of conventional yeast food and shortening.

Recently, an emulsifier is often used because of a shortage of experienced engineers for manufacturing foods, and a man-power shortage in the operation of the manufacture thereof, and also as a result of rationalization of the operation and diversification of foods. Heretofore, a synthetic emulsifier, such as lecithins and monoglycerides, has been employed as the emulsifier. Furthermore, in the fermentation of bread, yeast food containing synthetic compounds and mineral salts, and vitamin C for supplementing an insufficiency of the yeast food, have been employed to grow yeast.

However, foods made by using such synthetic emulsifier have an unpleasant flavor and have a taste of the emulsifier used, which deteriorates the original flavor and taste of the foods themselves. In addition, synthetic substances for foods, such as yeast foods containing a synthetic emulsifier and synthetic compounds(s), are suspected to cause health problems which may be derived from the continuous intake of the foods containing such substances for a long period of time. Thus, it becomes of urgent necessity to replace these various synthetic substances for foods with pure and naturally occurring substances.

SUMMARY OF THE INVENTION

It is accordingly an object of the present invention to provide an emulsified composition of oil and fat, and food made by using same which avoids the problems of the prior art.

Another object of the present invention is to provide an emulsified composition comprising 3% to 97% by weight of oil and fat, and 3% to 97% by weight of a fermented uncooked soybean paste.

A further object of the present invention is to provide a food, such as bread, which is made by using the emulsified composition of oil and fat, instead of using all or part of a yeast food and shortening made with a synthetic emulsifier which are usually employed in making the bread dough.

Briefly, in accordance with the present invention, there is provided a natural-type emulsified composition of oil and fat which does not employ any synthetic compound. The emulsified composition of oil and fat is made by mixing oil and fat, 3% to 97% by weight, with a fermented uncooked soybean paste, 3% to 97% by weight. The soybean paste is obtained by breaking the soybean to provide roughly broken soybean, feeding the roughly broken soybean into a sealed vessel, treating the soybean with steam under up to 1 kg/cm$^2$, rapidly discharging the soybean from the sealed vessel into the outside atmospheric pressure so that the soybean is puffed, powderizing it, and then fermenting the powder after adding malt and salt.

Also provided is a food, such as bread, made by using the emulsified composition of oil and fat instead of a yeast food or shortening which include a synthetic emulsifier.

DESCRIPTION OF THE PREFERRED EMBODIMENT

The present invention provides an emulsified composition of oil and fat comprising 3% to 97% by weight of oil and fat, and 3% to 97% by weight of a fermented uncooked soybean paste, and also provides a food, such as bread, made by using the emulsified composition of oil and fat instead of all or a part of a yeast food and shortening which include a synthetic emulsifier. A synthetic emulsifier is conventionally employed in making the bread dough.

Oil and fat according to the present invention means a natural edible oil and fat for food including a vegetable oil such as soybean oil or rape oil, and an animal oil such as a fish oil, a vegetable fat such as palm fat, palm kernel fat, or peanut fat, and an animal fat such as beef tallow or lard. Since an edible oil and fat affecting flavor and taste of foods generally melt at a temperature similar to that of the human body, it is preferable that the melting point of the oil and fat according to the present invention be at the same level as the temperature of the human body.

The fermented uncooked soybean paste according to the present invention is the one obtained according to the method disclosed in U.S. Pat. No. 4,985,259, namely the method comprising breaking the soybean into ½ to ⅛ in size to provide roughly broken soybean, feeding the roughly broken soybean into a sealed vessel, treating the soybean with steam under up to 1 kg/cm$^2$ for 3 minutes to 20 minutes, rapidly discharging the soybean from the sealed vessel into the outside atmosphere pressure so that the soybean is puffed, sprinkling hot water of 80 degrees C. to 90 degrees C. onto the powderized soybean, and then fermenting the powder after adding malt and salt.

The mixing ratio of the oil and fat to the fermented uncooked soybean paste ranges from 3/97 to 97/3. When the amount of the oil and fat is less than the above range, its emulsifying property is lost. Contrary, it becomes impossible to completely emulsify the oil and fat when its amount exceeds above upper limit. The optimum mixing ratio of the oil and fat to the fermented uncooked soybean paste is usually in the range of 40/60 to 60/40, although it depends on the foods to which they are added.

In order to mix and emulsify the oil and fat with the fermented uncooked soybean paste, it is convenient to use a high speed cutting mixer such as a Stephan cutter, made in Germany, or a cutting mixer made by Aikohsya K. K., a silent cutter for sausage or sea food products, a homogenizing mixer, a homogenizer, and the like.

In the ordinary bread manufacture, a sponge in sponge and dough method is prepared by adding raw yeast and yeast food to strong flour, and then kneading them with water. In the case of the emulsified composition of oil and fat according to the present invention, however, it is not necessary to add yeast food. Furthermore, in the main kneading thereof, the emulsified composition of oil and fat according to the present invention is added in a range from the same amount to a double amount of the conventional shortening which is replaced thereby.

REACTIONS

In the present invention, the precise reason is not clear why an oil and fat can be emulsified over such a wide range of the ratio, and why the yeast food can be replaced. It is tentatively considered that the following reactions may participate in the present invention.

(1) Extremely fine soybean oil and soybean proteins are intimately and homogeneously mixed in the soybean cell. In the manufacture of the soybean material for the fermented uncooked soybean paste, the soybean becomes porous in the progress of puffing, and then in the progress of fermentation, the proteins in the soybean are decomposed to increase the amino group and the carboxylic acid group at the surface. Therefore, there exists a lipophilic end (exposed soybean oil at the surface) and a hydrophilic end (amino group and carboxylic group exposed at the surface) in the fermented uncooked soybean paste, and thus it acts as a surfactant.

(2) Soybean proteins and phospholipid lecithins contained in the soybean, and minor components, as well as the saccharides (formed by decomposing fibrous parts of the soybean during the fermentation) increase the emulsifying ability thereof.

EXAMPLES OF THE MANUFACTURE OF THE EMULSIFIED COMPOSITION OF OIL AND FAT

Example 1

A portion of a mix including 55 parts by weight of vegetable oil and fat (melting point 30 degrees C.), which is used in the manufacture of shortening, was melted over a hot-water bath of 60 degrees C., and then transferred into a Stephan cutter, made in Germany, together with the other portion of the mix including 45 parts by weight of a fermented uncooked soybean paste. Stirring at a low speed (around 1500 RPM) for 1 minute and then at a high speed (around 3000 RPM) for 4 minutes afforded an emulsified composition of oil and fat.

Example 2

A portion of a mix including 55 parts by weight of an oil and fat (melting point 26 degrees C.), fractionated at the melting point derived from purified palm oil, was melted over a hot-water bath of 60 degrees C., and then transferred into a Stephan cutter, made in Germany, together with the other portion of the mix including 45 parts by weight of a fermented uncooked soybean paste. Stirring at a low speed (around 1500 RPM) for 1 minute and then at a high speed (around 3000 RPM) for 4 minutes afforded an emulsified composition of oil and fat.

Example 3

A portion of a mix including 55 parts by weight of purified lard of animal oil and fat was melted over a hot-water bath of 60 degrees C., and then transferred into a Stephan cutter, made in Germany, together with the other portion of the mix including 45 parts by weight of a fermented uncooked soybean paste. Stirring at a low speed (around 1500RPM) for 1 minute and then at a high speed (around 3000RPM) for 4 minutes afforded an emulsified composition of oil and fat.

EXAMPLES OF THE MANUFACTURE OF BREADS

Example 4

A sponge in sponge and dough method was prepared by adding 3 parts by weight of raw yeast to 80 parts by weight of strong flour, followed by adding 48 parts by weight of water. After adding 20 parts by weight of strong flour, 7 parts by weight of pure white sugar, 1.8 parts by weight of edible salt, 13 parts by weight of the emulsified composition of oil and fat, obtained in Example 1, and 19 parts by weight of water, the main kneading was conducted to provide a bread dough which was used to make a bread according to the conventional method.

Comparative Example 5

A sponge in sponge and dough method was prepared by adding 3 parts by weight of raw yeast and 0.1 parts by weight of yeast food to 80 parts by weight of strong flour, followed by adding 48 parts by weight of water. After adding 20 parts by weight of strong flour, 7 parts by weight of pure white sugar, 1.8 parts by weight of edible salt, 7 parts by weight of shortening, and 15 parts by weight of water, the main kneading was conducted to provide a bread dough which was used to make a bread according to the conventional method.

From the comparison of the manufacturing process of the bread made in Example 4 with that of the bread made in Comparative Example 5, it was confirmed that the emulsified composition of oil and fat according to the present invention can assist the activation of yeast even when yeast food is not added. Also, in the process of Example 4, it was unnecessary to adjust the fermentation time, and the preparation of the bread dough was stably operated owing to the emulsifying action of the composition.

In addition, a comparison of the both breads, by eating same, indicated that the bread according to the present invention was resistant to form a dumpling by absorbing saliva in the taster's mouth, which is known to be one of the disadvantages of a synthetic emulsifier. Also, the bread according to the present invention had a softer texture and a milder taste, and also dissolved easier in the taster's mouth as compared with the bread made by using shortening containing a synthetic emulsifier therein. Furthermore, when both breads were stored at a room temperature of 25 degrees C., a mold formation was not observed on the bread according to the presnt invention until one week after the baking thereof. However, a mold formation was observed on the bread of the Comparative Example 5 on the fourth day after the baking thereof.

MANUFACTURE OF CHOCOLATE SPREAD

A chocolate spread was made by adding 33 parts by weight of the emulsified composition of oil and fat, obtained in Example 2, into 20 parts by weight of cacao fat, 45 parts by weight of sugar, and 2 parts by weight of water, and then kneading same during the mixing thereof. The resulting product of the present invention had a smoother texture and a milder taste as compared with a conventional chocolate spread.

MANUFACTURE OF MAYONNAISE

Mayonnaise was made by adding 12 parts by weight of egg yolk, 5 parts by weight of vinegar, 2 parts by weight of mustard powder, and 1 part by weight of salt to 10 parts by weight of the emulsified composition of oil and fat, obtained in Example 2, and then kneading same during the mixing thereof, followed by adding 70 parts by weight of salad oil while mixing same. In the manufacture, it is easier to make the mayonnaise of the present invention, as compared with the conventional case, due to the resistance thereof to an oil separation when adding the salad oil. The resulting product of the present invention itself was also resistant to an oil separation, and was stable and homogeneous. Furthermore, it had a mild taste.

MANUFACTURE OF SAUSAGE

Sausage was made by adding 10 parts by weight of the emulsified composition of oil and fat, obtained in Example 3, to 29 parts by weight of a lean pig meat, 34 parts by weight of a fat pig back, and 15 parts by weight of bacon, followed by adding 2 parts by weight of red wine, 2 parts by weight of brandy, 1 part by weight of sugar, 1 part by weight of salt, 5 parts by weight of egg, and 1 part by weight of dogtooth violet starch, and then kneading same during the mixing thereof, and further processing same according to the usual method. The resulting product of the present invention was homogeneous, where the water therein did not separate therefrom, and it had a mild taste even after being stored in the refrigerator.

ADVANTAGES OF THE INVENTION

The emulsified composition of oil and fat, and the bread made by using same, according to the present invention, have the compositions and reactions as described above. Therefore, the present invention provides various advantages, where the emulsified composition of oil and fat prevents the incorporate therein of an unpreferable flavor and taste, which is derived from a synthetic emulsifier used in foods. Thus, the original flavor and taste of foods using the present invention can be fully retained. In addition, the components of foods using the present invention can be intimately mixed to provide a mild taste. Furthermore, the emulsified composition and the bread of the present invention solve the health problems which may be derived from a continuous intake of synthetic compounds for a long period of time.

What is claimed is:

1. An emulsified composition comprising:

oil and fat;

said oil being a natural edible oil, said natural edible oil is vegetable oil, soybean oil, rape oil, animal oil or fish oil;

said fat being a natural edible fat, said natural edible fat is a vegetable fat, palm fat, palm kernel fat, peanut fat, animal fat, beef tallow or lard;

said oil and fat being 3% to 97% by weight of said emulsified composition;

a fermented uncooked soybean paste;

said soybean paste being 3% to 97% by weight of said emulsified composition; and said percentage by weight of said oil and fat being inversely proportional to said percentage by weight of said soybean paste so that when said weight of said oil and fat is increased in said emulsified composition, said weight of said soybean paste is decreased therein, and when said weight of said oil and fat is decreased in said emulsified composition, said weight of said soybean paste is increased therein.

2. An emulsified composition according to claim 1, wherein said oil and fat have a mixing ratio by weight relative to said soybean paste, said mixing ratio ranging from 40/60 to 60/40.

3. An emulsified composition according to claim 1, wherein said oil and fat are 55 parts by weight of said emulsified composition, and said soybean paste is 45 parts by weight of said emulsified composition.

\* \* \* \* \*